Jan. 11, 1927. 1,613,874

G. B. DOREY

FRICTION DRAFT GEAR

Filed March 29, 1922  2 Sheets-Sheet 1

WITNESSES

INVENTOR

Geo. B. Dorey

Jan. 11, 1927.　　　G. B. DOREY　　　1,613,874

FRICTION DRAFT GEAR

Filed March 29, 1922　　　2 Sheets-Sheet 2

WITNESSES

INVENTOR
Geo B Dorey

Patented Jan. 11, 1927.

1,613,874

UNITED STATES PATENT OFFICE.

GEORGE BINET DOREY, OF MONTREAL, QUEBEC, CANADA, ASSIGNOR, BY MESNE ASSIGNMENTS, TO W. H. MINER, INC., A CORPORATION OF DELAWARE.

FRICTION DRAFT GEAR.

Application filed March 29, 1922. Serial No. 547,777.

My invention relates to improvements in friction draft gears of the type having friction members mounted for reciprocatory motion between friction surfaces and my invention resides more particularly in the novel means employed for inducing frictional adherence between the parts and the novel means employed to ensure the certain release of the parts after compression.

It is also an object of my invention to cause friction elements to move inwardly during the compressive action in a given sequence and to release in a different sequence to that of compression. While I am aware that numerous attempts have been made to secure this result in a draft gear such mechanism has been either dependent upon tripping action of some of the parts at a given point in the travel or upon the degree of frictional adhesion between the friction surfaces thereby relying purely upon an accidental condition or making it imperative that the gear should travel to a given point before being able to release in the desired manner; in my invention such action is secured by having elements move at different velocities and having the friction members moved inwardly by low speed elements and returned to the normal position by the high speed elements.

Another object of my invention is to provide an outer follower and an inner follower adapted to travel at different speeds and to provide for the displacement of friction members by the outer followers during compression and for the return of the said members in the release of the gear by the inner follower.

A further object of my invention is to cause a translatory motion across friction surfaces of longitudinally movable members abutting on friction shoes whereby the resistance to transverse movement will be increased by the extent of the friction generated by such transverse movement thereby operating to increase the load carried on the abutments during compression and operating to reduce the load carried thereon during release.

With these ends in view and other details of novelty such as will be more particularly pointed out hereinafter my invention resides in the peculiar construction, arrangements and combination of parts set forth in this specification and claims.

For a fuller comprehension of my invention reference must be had to the accompanying drawings wherein like references indicate like parts and wherein Fig. 1 shows a horizontal sectional plan view of the draft rigging as applied between the sills of a railway car.

Figure 1:
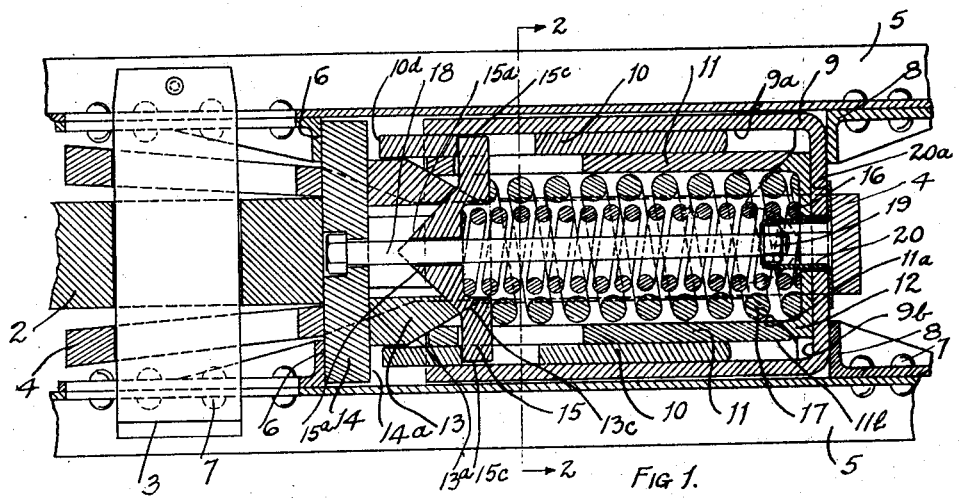

In the drawings a preferred embodiment of the invention is shown as applied between the sills of a railway car. The drawbar of the coupler 2 being connected by means of key 3 to the yoke 4 in the usual manner, the yoke embracing the draft gear proper and the whole being located between the center sills 5—5. In the illustration the draft gear is shown as abutting against front stops 6 secured to the center sills by means of rivets 7, rear stops 8 also secured to the center sills in like manner form stops under buffing strains.

The draft rigging consists of a casing 9 preferably formed by pressing from a metal plate and also preferably rectangular in shape.

The interior walls of the casing which are preferably flat and parallel constitute friction surfaces at 9$^a$ for movable friction members 10 mounted for reciprocatory motion between the casing walls and wedge elements 11. The spreading elements 11 abut on inclined walls 12$^b$ of a stationary member 12 and are adapted to form abutments at their outer ends for the main wedge block pressure transmitting members 13 which engage outer follower 14 and also inner follower 15, being interposed between these two follower members. Inner spring 16 and outer spring 17 are interposed between the inner follower member and the end of the casing. The entire gear is bolted as a self-contained unit by means of bolt 18 and nut 19, a cup seating being provided for the nut in member 20.

The casing, in this instance, is formed with four walls connected at the rear by means of the end wall forming a seating at 9$^b$ for stationary abutment 12, the interior walls being preferably straight and constituting friction surfaces at 9$^a$. The member 12 is preferably placed in a loosely mounted position in the casing being prevented from lateral displacement by means of lugs 12$^a$ which engage walls 9$^a$ of the casing; the exterior walls 12$^b$ which are inclined form wedging surfaces for similarly inclined surfaces 11$^a$ of the spreading elements 11. The central portion of the stationary member is recessed in order to form a seating for the springs as at 12$^c$ and a hole is formed in the base as at 12$^d$ for the purpose of receiving the cup seating 20. The spreading elements 11 each have a flat friction wall as at 11$^b$ adapted to register with one of the flat walls 10$^a$ of the friction members 10. The outer end of each spreading element 11 is formed with an inclined surface as at 11$^e$ forming an abutment for surface 13$^a$ of the pressure transmitting member 13. The pressure transmitting members are interposed between the outer follower 14 and the inner follower 15, the transverse surfaces 13$^b$ of each pressure transmitting member registering with inner surfaces 14$^a$ of the outer follower and inclined surface 13$^c$ registering with surface 15$^a$ of the inner follower which is provided with oppositely inclined surfaces inclined to the line of draft. The inner follower has portions extending outwardly therefrom as at 15$^b$ and are formed at each end with a flat portion 15$^c$ constituting guides adapted to abut against the casing walls 9$^a$ in case the said follower should be displaced from its central position. The portions 15$^b$ are extended through slots 11$^d$ formed in the spreading elements 11 and 10$^b$ in the friction members. The surface 15$^d$ of the extending portion is adapted to engage bearing 10$^c$, forming the outer wall of the slot 10$^b$, for the purpose of moving the members 10 longitudinally out of the casing during the release operation of the gear. A recess is provided at 15$^e$ to receive the inner spring, the outer spring abutting on surface 15$^f$ and a centrally disposed hole formed in the member at 15$^g$ permits the passage of the bolt therethrough.

The wedge pressure transmitting members are recessed at 13$^d$ for the purpose of clearing the bolt when the members move transversely towards each other. The nut 19 is enclosed in the removable cup seating 20 which is preferably made by stamping from a metal plate and includes a socket portion extended for a distance longitudinally permitting the insertion of a wrench or bar therein whereby rotation of the nut is effected by turning the seating instead of directly engaging the nut with a wrench; the side walls of the nut are made to have locking engagement with the interior walls of the socket portion and consequently both the nut and seating turn in unison; the member is formed with the thin flange 20$^a$ by means of which inward movement of the member is prevented.

The operation of the gear takes place as follows:—In draft or buffing the draft gear is compressed by relative approach of the follower to the casing. During the initial stage of the compression movement the pressure transmitting members 13 move longitudinally into the casing and by reason of the contact between the surface 13$^a$ and beveled portion 11$^e$ of the spreading element 11 there will also be transverse movement towards each other thereby exerting a squeezing effect upon the surfaces 15$^a$ of the inner follower, causing this latter member to move at a greater speed than the outer follower. In effect the wedge pressure transmitting members together with the outer follower and inner follower constitute the compressible portion of the mechanism. It will be seen that transverse movement of the pressure transmitting members towards each other operates to move the inner follower away from the outer follower. Such transverse movement is retarded by the friction between surfaces 13$^b$ and 14$^a$ at the outer end and between surfaces 13$^a$ and 15$^e$ at the inner end and inasmuch as the springs bear directly on the inner follower it will be apparent that such frictional action will not in any way cause binding of the parts but will provide a yielding frictional resistance operating to place a definite proportion of the load on the spreading elements 11 which form abutments for the wedge block pressure transmitting members. The transverse reaction will serve to move the spreading elements 11 outwardly thereby forcing the friction members 10 against the casing walls 9$^a$. Due to the inclined surfaces of the spreading elements 11 and the longitudinal pressure placed thereon it will be evident that there will also be a longitudinal reaction on the spreading elements 11 and this is converted into a transversely acting force at the inner end thereof by reason of the inclined surface 11ª registering with inclined surface 12ᶜ of the stationary member 12. Thus it will be seen that members having at one end of friction spreading elements 11 a transverse and longitudinal reaction thereon will force such members transversely against friction members while maintaining a constant and uniform movement of their own in a longitudinal direction.

Figures 2, 3:
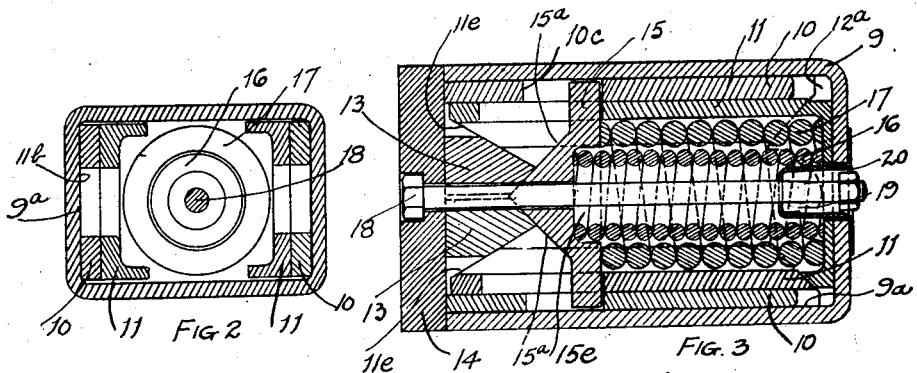
Figure 2 is a transverse sectional view of the rigging taken on line 2—2 of Fig. 1.
Figure 3 is a view similar to Figure 1, showing the gear in the fully compressed position.

In order to provide for easy starting of trains it is desirable to allow a short travel of the gear before causing the outer follower to act on the friction members 10. The pressure transmitting members having moved inwardly into the casing a sufficient distance to permit the follower 14 to come in contact with surface 10ᵈ of the friction members, the latter will be moved inwardly into the casing having frictional action between the casing walls and spreading elements 11. As the inward movement progresses the member 10 will move in unison with the follower 14 whereas the inner follower will move at a greater speed in the manner already explained. This variation in the speed of the various members is compensated for by the slot 10ᵇ within which the inner follower portions 15ᵇ move; the abutment of the inner follower as at 15ᵈ draws away from the upper abutment 10ᶜ of the slot until when the gear is fully compressed the distance between the respective abutments is at its maximum as shown in Figure 3.

Figure 4:
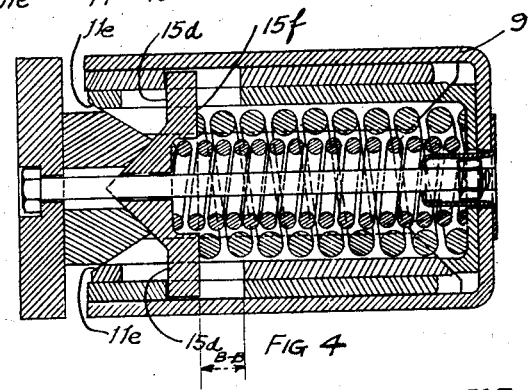
Figure 4 is a view similar to Fig. 1, showing the gear partially released with the friction members still in the maximum compressed position and the inner followers moved into engagement therewith.
Figure 5:
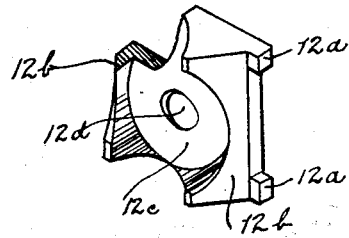
Figure 5 is a perspective view in section of the inclined stationary abutment.
Figure 6:
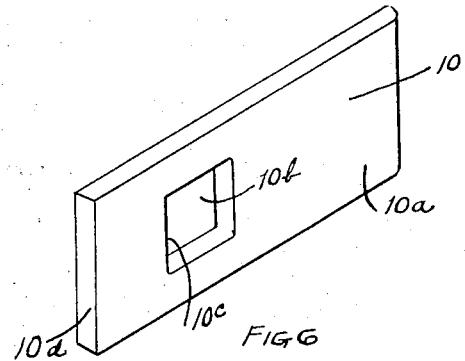
Figure 6 is a perspective view of the longitudinally movable friction member.
Figure 7:
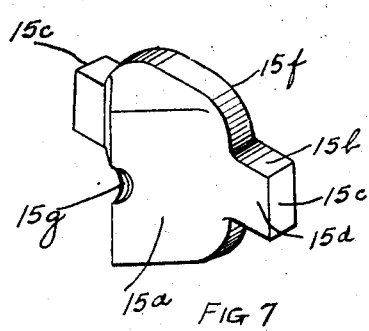
Figure 7 is a perspective view of the inner or high speed follower.
Figure 8:
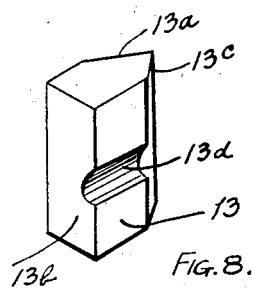
Figure 8 is a perspective view of one of the wedge pressure transmitting members.
Figure 9:
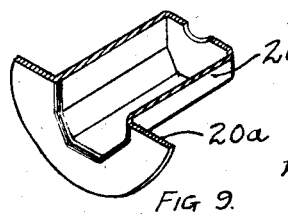
Figure 9 is a perspective sectional view of the casing constituting a seating for the nut.
Figure 10:
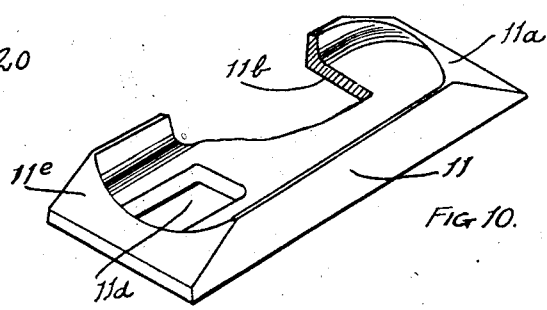
Figure 10 is a perspective view of one of the friction shoes.

The draft rigging being fully compressed and the follower 14 abutting on the casing, the release of the rigging takes place as follows:—The springs expand returning the inner follower outwardly and the wedge pressure transmitting members with the outer follower therewith, there being close frictional adhesion between the transverse surfaces of the wedge block pressure transmitting members and the transverse surfaces of the followers thereby operating to reduce the transverse reaction on the friction spreading elements 11 and permitting easy withdrawal of the friction members from between the casing wall and shoes. It is to be noted that the inner follower travels in a forward direction for a little distance before engaging the friction members as shown in Fig. 4, this distance being designated by the line B—B on the illustration. Having made the engagement the lost motion is rapidly compensated for by the fact that the inner follower moves the friction members at a greater rate of speed than the outer follower, the return of the friction members at this increased speed being rendered possible due to the transversely acting reaction on the spreading elements 11 being reduced to a minimum.

The disposition of friction members at the side of the springs provides for large bearing areas without multiplicity of bearing faces thereby reducing the need for frequent repairs and replacements. The central friction mechanism as constituted by the outer follower, pressure transmitting members and the inner follower working in conjunction with the springs present a well known combination of parts which has been in successful operation for a number of years and I make no claim to this particular combination in itself. The defect of this combination as heretofore used has been its low capacity and I overcome this defect in my invention by placing auxiliary shock absorbers side by side with the springs and utilizing the transverse re-action to secure the necessary clamping force while at the same time ensuring certain release of the gear.

What I claim is:—

1. In a friction shock absorbing mechanism, the combination with a main follower; of a friction casing; lateral pressure-transmitting elements having longitudinal friction surfaces; floating friction elements coacting with said friction casing and the friction surfaces of said lateral pressure-transmitting elements; means for forcing said last named elements apart, including transversely and longitudinally movable wedge elements having frictional engagement with the follower and cooperating with said lateral pressure transmitting elements to retard inward movement of said floating members; a wedge follower coacting with said wedge elements; and a longitudinally disposed spring resistance element opposing both longitudinal and transverse movement of said wedge members.

2. In a friction shock absorbing mechanism, the combination with a main follower; of a friction shell; floating friction members coacting with said shell; lateral pressure-transmitting elements coacting with said members; spreading means co-operating with said last named members, said spreading means including transversely and longitudinally movable wedges having frictional contact with the main follower adapted to force said elements against said floating members and a wedge follower coacting with said wedges; and spring means compressible in the line of draft disposed at the side of the floating friction members and adapted to maintain the parts in operative relation.

3. In a friction shock absorbing mechanism, the combination with a casing; of lateral pressure-transmitting elements; a wedge means extending from element to element disposed in fixed relation to the casing; friction devices in engagement with the casing and coacting with said elements; longitudinally and transversely movable pressure-transmitting members, said lateral pressure-transmitting elements each having their opposed ends wedge shaped and the longitudinally and transversely movable members acting on one end of each of said elements, and the means extending from element to element acting on the opposite end of each of said elements to force the same outwardly against the friction devices; a wedge follower coacting with said members; and springs for maintaining the parts in operative relation.

4. In a friction shock absorbing mechanism, the combination with a friction casing; of wedging means in engagement therewith; friction wedge elements; friction members mounted for reciprocatory motion between the casing and elements; longitudinally and transversely movable pressure-transmitting members; wedge follower means coacting with said last named members, said elements each having the ends thereof formed with oppositely disposed wedging surfaces forming at one end thereof an abutment for the longitudinally and transversely movable pressure-transmitting members and having the opposite end thereto in wedging engagement with said wedging means; and spring means for maintaining the parts in operative position.

5. In a friction shock absorbing mechanism, the combination with a casing; of friction elements; friction members mounted for reciprocatory motion between the elements and casing; an outer main follower and an inner follower; means for forcing said friction elements outwardly against the friction members, said means including transversely movable members interposed between the followers, said main follower having a flat friction surface cooperating with similar surfaces on the transversely movable members said cooperating surfaces being substantially at right angles to the line of draft and the other follower having its surface composed of faces angularly disposed to the surface of the other follower; and spring means opposing inward movement of the inner follower.

6. In a friction shock absorbing mechanism, the combination with a casing; of friction elements; movable friction members; a main follower; means including wedge blocks and a wedge follower co-acting with said wedge blocks for forcing the friction elements outwardly against the friction members, said wedge blocks having longitudinal and transverse movement, said friction members being normally spaced from the follower and adapted to be engaged thereby at a predetermined point in the travel and thereafter move in unison therewith; and spring means disposed at the side of the friction members opposing the transverse and longitudinal movement of the wedge blocks.

7. In a friction shock absorbing mechanism, the combination with a friction casing; of friction members coacting with said casing; lateral pressure-transmitting elements coacting with said members; a main follower; means including pressure-transmitting members movable transversely of said follower for forcing said elements outwardly against the friction members, said last named members being adapted to be directly engaged by the follower and moved longitudinally of the mechanism in one direction and adapted to be moved in the opposite direction at a different speed than the follower; a spring follower coacting with said pressure-transmitting members; and spring means for maintaining the parts in operative relation.

8. In a friction shock absorbing mechanism, the combination with a casing having interior friction surfaces; of lateral pressure-transmitting elements; movable friction members; an inner follower; means including transversely movable members engaging said friction elements and disposed between the followers, adapted to wedge the friction members between the friction elements and the casing friction surfaces, said friction members being movable by the outer follower during compression and by the inner follower during release; and spring means adapted to maintain the parts in operative position.

9. In a friction shock absorbing mechanism, the combination with a casing; of longitudinally disposed lateral pressure-transmitting elements, said elements having slots therein; outer and inner followers; movable friction members interposed between the casing and each of said elements; wedge means coacting with said elements, said inner follower having means extending through the slots in said elements and engaging the friction members; and spring means engaging the inner follower.

10. A friction draft gear comprising outer and inner followers, co-acting friction members and means for pressing said friction members against each other, one of said friction members having end walls, side walls and a slot formed therein intermediate the end walls, the outer follower acting on one of the end walls to move the member in one direction and the inner follower engaging the slot to move the said member in the opposite direction.

11. In a friction shock absorbing mechanism, the combination with a casing having friction surfaces on the interior thereof; of friction members; a spring resistance; a follower coacting with said spring resistance; floating members relatively movable to and interposed between said first named members and the friction surfaces of the casing; wedge-pressure-transmitting means including members having wedge faces, one of which is adapted to apply pressure to one of said first named friction members and the other of which is adapted to act on the follower coacting with the spring resistance to compress the same.

12. In a friction shock absorbing mechanism, the combination with a casing presenting oppositely disposed, substantially parallel interior surfaces; of wedge pressure-transmitting members; a spring follower coacting with said members; friction elements within the casing; movable friction members in engagement with the casing and with said first named friction elements, means for forcing said first named elements outwardly against said movable friction members, said means including the wedge pressure transmitting members, each of said pressure-transmitting members having adjacent wedging surfaces, one of such surfaces abutting one of said first named friction elements and the other of said surfaces coacting with said spring follower; and spring means opposing movement of said parts.

13. In a friction shock absorbing mechanism, the combination with a relatively stationary casing; of longitudinally movable friction members in engagement therewith; a follower; lateral pressure-transmitting elements having friction surfaces co-acting with said members; means for forcing said elements against the friction members, said means including transversely and longitudinally movable wedge members; spring means resisting inward movement of the wedge members; an additional wedge member interposed between the first named wedge members and the spring means, said additional wedge member being adapted to move at a greater speed than the friction members.

14. In a friction shock absorbing mechanism, the combination with a main follower; of a friction shell; movable friction elements coacting with the shell, said elements being normally spaced from said main follower and engageable by said follower after a predetermined amount of relative movement between the follower and shell to effect movement of said elements with said follower; lateral pressure-transmitting members coacting with said elements; fixed wedging means within the shell coacting with said members; spreading means coacting with said follower and pressure-transmitting members, said spreading means including wedge friction shoes laterally slidable on said main follower, and a wedge follower coacting with said shoes; and a spring resistance cooperating with said spreading means.

15. In a friction shock absorbing mechanism, the combination with a friction shell; of lateral pressure-transmitting plates disposed in said shell; outer and inner followers; wedge means co-operating with said plates, including transversely movable wedges interposed between said followers; friction members interposed between said plates and shell, said plates having slots formed therein and the inner follower having a portion extending through said slots and engaging the friction members; and spring means resisting inward movement of said inner follower.

16. In a friction shock absorbing mechanism, the combination with a friction shell; of lateral pressure-transmitting friction elements within said shell; an outer follower; an inner follower; wedge means co-operating with said elements, including transversely movable wedges interposed between said followers; movable friction members interposed between said elements and the shell, said elements and members having slots formed therein and the inner follower having extensions passing through said slots and being adapted to engage said members and moving freely in said slots during a compressive action of the gear and re-engage said members during release of the gear; and spring means resisting inward movement of the parts.

17. In a friction draft gear, the combination with a casing, spring means and frictional elements; of means for securing the same together; the said means comprising a bolt and nut; the bolt engaging one of the frictional elements and the nut being mounted in a cup seating and locked thereto whereby rotation of the seating will also effect rotation of the nut.

18. In a friction shock absorbing mechanism, the combination with a follower acting member; of movable friction means, said member and means having co-acting, longitudinally disposed friction surfaces, said means being slotted between the ends thereof; means for pressing said friction means against said member; an outer main follower; an inner follower, the outer follower being adapted to engage one end of said friction means to move the same in one direction and said inner follower engaging said friction means to move the same in the opposite direction.

In testimony whereof I affix my signature.

GEORGE BINET DOREY.